United States Patent
Yamanaka et al.

[11] Patent Number: 6,001,934
[45] Date of Patent: Dec. 14, 1999

[54] PROCESS FOR THE PREPARATION OF A FUNCTIONAL GROUP-CONTAINING POLYARYLENE SULFIDE RESIN

[75] Inventors: Hidenori Yamanaka; Osamu Komiyama, both of Chiba-Ken, Japan

[73] Assignee: Tonen Chemical Co., Tokyo, Japan

[21] Appl. No.: 09/144,462

[22] Filed: Sep. 1, 1998

[30] Foreign Application Priority Data

Sep. 3, 1997 [JP] Japan .................................. 9-252691
Apr. 3, 1998 [JP] Japan ................................ 10-107165

[51] Int. Cl.⁶ .............................. C08C 19/04; C08F 8/06
[52] U.S. Cl. ...................... 525/383; 525/388; 525/146; 525/148; 528/387; 528/388; 528/391
[58] Field of Search ................................ 528/387, 388, 528/391; 525/146, 148, 383, 388

[56] References Cited

U.S. PATENT DOCUMENTS 3,717,620  2/1973  Rohlfing .
3,793,256  2/1974  Scoggin .
5,231,163  7/1993  Kosaka et al. .......................... 528/388

*Primary Examiner*—Duc Truong
*Attorney, Agent, or Firm*—Cowan, Liebowitz & Latman, P.C.; William H. Dippert, Esq.

[57] ABSTRACT

A simple and convenient process is provided to introduce a sufficient quantity of functional groups to a main chain or terminals of the chain of a polyarylene sulfide resin to improve properties of the resin.

The invention provides a process for heat oxidation crosslinking a polyarylene sulfide resin, characterized by conducting the heat oxidation crosslinking reaction in the presence of at least one organic compound having at least one active-hydrogen-containing group or at least one organic compound having at least one active-hydrogen-containing group and a group derived from an active hydrogen containing group by substituting an active hydrogen of the active hydrogen containing group with an alkali metal, to thereby prepare a functional group-containing polyarylene sulfide resin.

16 Claims, 4 Drawing Sheets

PROCESS FOR THE PREPARATION OF A FUNCTIONAL GROUP-CONTAINING POLYARYLENE SULFIDE RESIN

FIELD OF THE INVENTION

The present invention relates to a process for the preparation of a functional group-containing polyarylene sulfide (hereinafter referred to as PAS) resin.

PRIOR ART

PAS is an engineering plastic having excellent heat resistance, chemical resistance, flame retardance and mechanical properties. On the other hand, however, it has a problem that its compatibility with other resines is poor and a problem that its molded products have poor coating properties.

Heretofore, functional groups have been introduced to PAS in order to improve the chataceristics, coating properties, or compatibility with other resins. Many methods are known to introduce functional groups to PAS and can be roughly classified into two groups. First, there are methods of melt kneading a compound having a functional group with PAS obtained by usual reaction, for example, a method of melt kneading PAS and maleic anhydride (Japanese Laid Open Hei-1-213360, Japanese Laid Open Hei-1-259060, Japanese Laid Open Hei-1-266160, Japanese Laid Open Hei-1-230667, Japanese Laid Open Hei-2-182726, Japanese Laid Open Hei-2-208363, Japanese Laid Open Hei-2-214774 and Japanese Laid Open Hei-2-283763) and a method of melt kneading uncrosslinked PAS and α, β-ethylenically unsaturated carbonyl compound in the presence or absence of a radical polymerization catalyst (Japanese Laid Open Hei-4-309513). Secondly, there are methods of introducing functional groups to a main chain of the polymer during the polymerization process of PAS, for example, a method of copolymerizing a functional group-containing polyhalo compound (Japanese Publication Sho-45-3368, Japanese Laid Open Sho-48-16078, Japanese Laid Open Sho-62-95320, Japanese Laid Open Sho-62-185717 and Japanese Laid Open Hei-7-102064).

However, in the first group of the methods (methods of melt kneading), efficiency of the introduction of functional groups is low, so that the improvement of the resin is insufficient. In the second group of the methods (method of copolymerization), there are problems that the introduction of functional groups are insufficient due to essentially low reactivity of the functional group-containing polyhalo compounds and the procedures are complicated for introducing a sufficient amount of functional groups.

BRIEF DESCRIPTION OF THE INVENTION

The purpose of this invention is to provide a simple method to introduce a sufficient quantity of functional groups to a PAS resin at its main chain or terminals.

The present inventors have now found that a desired quantity of specific functional groups can be introduced into PAS by providing a specific compound in a heat oxidation crosslinking process which is usually conducted to raise the molecular weight of PAS.

The present invention provides, in one aspect, the following processes:

(1) A process for heat oxidation crosslinking a polyarylene sulfide resin, characterized by conducting the heat oxidation crosslinking reaction in the presence of at least one organic compound having at least one active-hydrogen-containing group to thereby prepare a functional group-containing polyarylene sulfide resin.

Preferred embodiments include the following:

(2) A process described in (1) above, wherein the active hydrogen containing group is selected from the group consisting of —H, —OH, —NH$_2$, —COOH, —CHO and —SO$_3$H H.

(3) A process described in (1) above, wherein the organic compound having at least one active hydrogen containing group is selected from the group consisting of compounds (I) to (V):

(I)

wherein X and Y are a group independently selected from the group consisting of —SH, —OH, —NH$_2$, —COOH, —CHO and —SO$_3$H; R is a group independently selected from a hydrogen atom, a halogen atom, lower alkyl groups and lower alkoxyl groups; p=0 to 4, q=1 to 5, r=1 to 5 and p+q+r=6,

(II)

wherein X, Y and R have the same meaning as defined above; Z is —O—, —SO—, —SO$_2$—, —S—, —CO—, or —(CR$^a_2$)$_m$—, wherein R$^a$ is a hydrogen atom, a lower alkyl group or a lower alkoxy group, and m=1 to 4; and s=1 to 5, h=0 to 4 and s+h=5, t=1 to 5, j=0 to 4 and t+j=5, i=0 to 4 and n=0 to 11,

(III)

wherein X, Y and R have the same meaning as defined above; u=1 to 5, k=0 to 4 and u+k=5, v=1 to 4, g=0 to 3 and v+g=4, (V)

wherein X, Y and R have the same meaning as defined above; and y=1 to 4, a=0 to 3 and y+a=4, z=1 to 4, b=0 to 3 and z+b=4, c=0 to 4, y'=1 to 3, z'=1 to 3 and y'+z'=4,

(VI)

wherein X, Y and R have the same meaning as defined above; and e=1 to 5, c=0 to 4, and e+c=5, f=1 to 5, d=0 to 4 and f+d=5.

(4) A process described in (1) above, wherein 0.05 to 10 parts by weight of the organic compound having at least one active-hydrogen-containing group is used per 100 parts by weight of a polyarylene sulfide polymer.

(5) A process described in (1) above, wherein the organic compound is represented by one of the following formulas:

(i)

(ii)

(iii)

(iv)

(v)

(6) A process described in (1) above, wherein the organic compound has at least two of the active hydrogen-containing groups.

(7) A process for heat oxidation crosslinking a polyarylene sulfide polymer in an oxygen containing atmosphere, characterized by conducting the heat oxidation crosslinking reaction in the presence of an organic compound having at least one active-hydrogen-containing group and a group derived from an active hydrogen containing group by substituting an active hydrogen atom of the active hydrogen containing group with an alkali metal, to thereby prepare a functional group-containing polyarylene sulfide resin.

In the aforesaid first aspect, it is intended that the active hydrogen containing groups are brought into a radical state to link a part of the active hydrogen containing groups directly with PAS molecules in the heat oxidation crosslinking, so that the characteristics of the resin is improved by the remaining active hydrogen containing groups. Accordingly, it is unavoidable that the degree of improvement of the characteristics of the resin depends, to some extent, on the conditions of heat oxidation crosslinking and, therefore, PAS having a desired quality is obtained by precise control of the temperature, time, etc. in the heat treatment. The present inventors have made further research for further improvement of the first aspect of the invention. As a result, we have now found that when PAS is heat oxidation cross-linked in the presence of an organic compound having a group derived from the active hydrogen containing group, particularly —COOH, —OH, —SH and —SO$_3$H, by substituting an active hydrogen atom of the active hydrogen containing group with an alkali metal and an active hydrogen containing group together, radicals are formed in the active hydrogen containing groups to link with PAS molecules directly, while the above-described alkali metal-substituted group does not form a radical and can be introduced surely into PAS molecules. In this process, precise control of heat oxidation crosslinking conditions is unnecessary, and the desired improvement of PAS quality can be achieved simply and easily. The organic compound may preferably be aromatic compounds. With the aromatic compounds, radicals can be formed in a benzen ring and the introduction of said compound into PAS can be more facilitated.

Preferred embodiments of the second aspect of the invention include the following:

(8) A process described in (7) above, wherein the group derived by substituting an active hydrogen atom of an active hydrogen containing group with an alkali metal is selected from the group consisting of —COOA, —OA, —SA and —SO$_3$A, wherein A represents an alkali metal.

(9) A process described in (7) above, wherein the active hydrogen containing group is selected from the group consisting of —CH=CH$_2$, —SH, —OH, —NH$_2$, —COOH, —CHO and —SO$_3$H.

(10) A process described in (7) above, wherein the organic compound is an aromatic compound.

(11) A process described in (7), wherein the organic compound is selected from the following group of compounds:

(I')

wherein X is a group independently selected from the group consisting of —CH=CH$_2$, —SH, —OH, —NH$_2$, —COOH, —CHO and —SO$_3$H; Y is a group independently selected from the group consisting of —COOA, —OA, —SA and —SO$_3$A, wherein A represents an alkali metal; R is a group independently selected from a hydrogen atom, a halogen atom, lower alkyl groups and lower alkoxyl groups; p=0 to 4, q=1 to 5, r=1 to 5 and p+q+r=6,

(II')

wherein X, Y and R have the same meaning as defined above; Z is —O—, —SO—, —SO$_2$—, —S—, —CO—, or —(CR$^a{}_2$)$_m$-, wherein R$^a$ is a hydrogen atom, a lower alkyl group or a lower alkoxy group, and m=1 to 4; and s=1 to 5, h=0 to 4 and s+h=5, t=1 to 5, j=0 to 4 and t+j=5, i=0 to 4 and n=0 to 11,

(III')

wherein X, Y and R have the same meaning as defined above; u=1 to 5, k=0 to 4 and u+k=5, v=1 to 4, g=0 to 3 and v+g=4,

(IV')

wherein X, Y and R have the same meaning as defined above; w=1 to 5, m=0 to 4 and w+m=5, x=1 to 4, n=0 to 3 and x+n=4, (V')

wherein X, Y and R have the same meaning as defined above; and y=1 to 4, a 0 to 3 and y+a=4, z=1 to 4, b=0 to 3 and z+b=4, c=0 to 4, y'=1 to 3, z'=1to 3 and y'+z'=4, (VI')

wherein X,Y and R have the same meaning as defined above; and e=1 to 5, c=0 to 4, and e+c=5, f=1 to 5, d=0 to 4 and f+d=5.

(12) A process described in (7) above, wherein the organic compound is represented by the following formulas.

(VII)

wherein Y has the same meaning as defined above.

(13) A process described in (7), wherein the organic compound is represented by one of the following formulas (i') to (v'):

(14) A process described in (7), wherein 0.05 to 10 parts by weight of the organic compound is used per 100 parts by weight of a polyarylene sulfide polymer.

(15) A process described in (7), wherein 0.1 to 3 parts by weight of the organic compound is used per 100 parts by weight of polyarylene sulfide polymer.

(16) A process described in (1) or (7) above, wherein the active hydrogen containing group is selected from the group consisting of —SH, —OH, —NH$_2$, —NHR', —COOH, —CONH$_2$, —CONHR', —SO$_3$H, —CHO, —CH═CH$_2$, —CH═CHR', —C≡CH, wherein R' is organic group.

PREFERRED EMBODIMENTS OF THE INVENTION

There is no special limitation on a polyarylene sulfide polymer used for the introduction of a functional group (hereinafter referred to as starting material PAS), and any polyarylene sulfide polymer produced by any publicly known process can be used. The starting material PAS can be produced, for example, by the method of reacting dihaloaromatic compounds with alkali metal sulfides in organic amide solvents (Japanese Patent Publication Sho-45-3368). Melt viscosity $V_6$ of the starting material PAS is preferably 50 to 10,000 poises, more preferably 100 to 5,000 poises, as measured by a flow tester after the PAS is kept under the conditions of 300° C. a load of 20 kg/cm$^2$ and L/D=10 for 6 minutes.

The organic compound having at least one active hydrogen containing group to be used in the first aspect of this invention, and the organic compound having an active hydrogen containing groups and a group derived from an active hydrogen containing group by substituting an active hydrogen atom of the active hydrogen containing group with an alkali metal to be used in the second aspect of this invention will be described below. In this specification, by an active hydrogen containing group is meant a functional group containing an active hydrogen atom which includes not only a hydrogen atom bonding directly to a heteroatom other than a carbon atom, but also a highly reactive hydrogen atom such as a hydrogen atom bonding to a carbon atom constituting an unsaturated group and a hydrogen atom bonding to a carbon atom bonding directly to a benzene ring. The active hydrogen containing group includes, for example, —SH, —OH, —NH$_2$, —NHR, —COOH, —CONH$_2$, —CONHR, —SO$_3$H, —CHO, —CH=CH$_2$— CH=CHR and —C≡CH, wherein R represents an organic group such as an alkyl group and aryl group, and lower alkyl groups (preferably methyl, ethyl and propyl groups) linked to a benzene ring. Preferably, the active hydrogen containing group is selected from —CH=CH$_2$, —SH, —OH, —NH$_2$, —COOH, —CHO and —SO$_3$ H. A single species of the active hydrogen containing group may be present alone or in plurality, or two or more of the groups may be present in a molecule.

The group derived from an active hydrogen containing group by substituting an active hydrogen atom of the active hydrogen containing group with an alkali metal is a group obtained by substituting an active hydrogen atom of the above-described hydrogen containing group with an alkali metal, and is preferably —COOA, —OA, —SA and —SO$_3$A, wherein A represents an alkali metal, preferably Na and K. A single species of the group may be present alone or in plurality, or two or more of the groups may be present in a molecule.

As the organic compounds having at least one active hydrogen containing group used in the first aspect of the invention, the group of the compounds represented by the chemical formulas (I) to (III), (V) and (VI) may preferably be used. In these formulas, the lower alkyl groups may be either linear or branched, for example, methyl, ethyl, propyl, butyl and pentyl. The lower alkoxyl groups may be those derived from these alkyl groups. The compounds represented by the chemical formulas (i) to (v) are particularly preferred.

As the organic compounds to be used in the second aspect on the invention, the group of the compounds represented by the formulas (I') to (VI') may preferably be used. In these formulas, the alkyl groups are those having one to six carbon atoms and may be either linear or branched, for example, methyl, ethyl, propyl, butyl and pentyl. The lower alkoxyl groups may be those derived from these alkyl groups. The compounds represented by the chemical formula (VII), more particularly by (i') to (iii'), are preferred:

The oxidation crosslinking reaction is conducted, for example, as follows. That is, PAS is heated in a solid state, for example, below the melting point of PAS to crosslink. The treating temperature in the oxidation crosslinking is preferably 160° C. to 260° C., more preferably 180° C. to 230° C. At a temperature lower than 160° C., a longer time is needed for the oxidation crosslinking, which is uneconomical. Meanwhile, at a temperature exceeding 260° C., the polymer chain tends to degrade. PAS may be generally in a powdery form, but pellets also can be used, which are prepared by kneading the above-described compound with powdery PAS together. The oxygen containing atmosphere may be, for example, air, pure oxygen, or mixture gas of these with any inert gas, such as nitrogen or carbon dioxide. In the mixture gas containing oxygen, a concentration of oxygen is preferably 0.5% to 50% by volume, more preferably 10% to 25% by volume. If the oxygen concentration is too high, too much radical generates, so that viscosity increase in a melt state becomes significant, and the color tends to become dark. Meanwhile, if the oxygen concentration is too low, a reaction rate of the oxidation crosslinking tends to become slow. Reaction time is not specially limited, and the reaction is continued until a desired melt viscosity is attained. Further, an introduced quantity of the functional group can be adjusted by adjusting the reaction time, depending upon applications of PAS.

It is sufficient that the organic compound presents at the time when the starting material PAS is subjected to the oxidation crosslinking reaction. The above-described compounds may be mixed with the starting material PAS in advance, or may be put into an oxidation crosslinking equipment together with the starting material PAS. Alternatively, the starting material PAS is placed in the equipment, to which the above-described compound is then gradually added while carrying out the oxidation crosslinking. As a method of mixing the above-described compound with the starting material PAS in advance, the following methods can be used. For example, if the above-described compound is powdery, dry blending may be carried out with a Henschel mixer. If the above-described compound is liquid at room temperature, it may be spraled onto the starting material PAS. Alternatively, the above-described compound may be added in a form of solution prepared by dissolving the compound in a suitable volatile solvent (such as methanol, ethanol, acetone, ethers, chloroform, dichloromethane, ethylacetate, tetrahydrofurane, etc.) if the compound is powdery, or in a form of an aqueous solution having a suitable pH if it is water soluble. If the above-described compound is liquid and soluble in a suitable volatile solvent, a properly diluted solution of it may be added to the starting material PAS.

These compounds may also be added and mixed at the time when the starting material PAS is pelletized.

The organic compound used in the second aspect of the invention can be produced by dissolving a synthesized compound having a plurality of active hydrogen containing groups in, for instance, an aqueous solution having a suitable pH to convert a part of the groups into a salt of an alkali metal such as sodium or potassium. By reacting it with PAS as described above, a group in which a hydrogen atom of the active hydrogen containing groups is substituted with an alkali metal such as sodium or potassium can be introduced into PAS. Then, this PAS may be dissolved or suspended and its alkali metal may be exchanged with a hydrogen atom using an inorganic acid such as hydrochloric acid or sulfuric acid to produce a desired PAS with improved properties. This exchange of the alkali metal with a hydrogen atom is not essential but preferable because adhesive strength of PAS is significantly raised.

In the oxidation crosslinking reaction, the above-described organic compound having at least one active hydrogen containing group or the organic compound for the second aspect of the invention is used in an amount of at least 0.05 part by weight, preferably at least 0.1 part by weight, and at most 10 parts by weight, preferably at most 3 part, per 100 parts by weight of the starting material PAS. When the quantity of the above-described compounds is too small, the effect of improvement of the resin is less. When it is too much, problems occur that the melt viscosity increases or a large volume of gas generates.

A method to conduct the oxidation crosslinking is not specially limited, and any publicly known conventional method can be applied. Methods with various types of equipment can be used, for example, a method where use is made of a forced hot air circulating dryer (U.S. Pat. No. 3,354,129), a method where use is made of a fixed vessel type heating and mixing equipment mounted with double screw type stirring blades (U.S. Pat. No. 3,717,620), a method where use is made of a fluidized bed (U.S. Pat. No. 3,793,256), a method where use is made of a jacketed fluidized bed reactor mounted with an inner stirrer (Japanese Patent Publication Sho-62-177027), a method where use is made of a screw type mixing heater, a high speed revolution blades mixing type heater (Japanese Patent Application Laid Open Hei-7-242746).

In carrying out the above-described oxidation crosslinking, a radical initiator or a radical polymerization aid can be added in order to raise a degree of the crosslinking of PAS and a rate of the introduction of the organic compound into PAS,. As such an agent, for example, peroxides such as benzoyl peroxide, lauroyl peroxide, dicumyl peroxide, and azo compounds such as azobis isobutylonitril can be used.

The functional group containing PAS resin thus obtained is given various characteristics and can be widely applied because of the reactivity of the introduced functional group. For example, adhesion to glass fibre and metal surface is improved and therefore it may be used in glass filled extrusion products or products to be powder coated, so that metal plating and coating to the surface of these products can be done without difficulty. The functional group containing PAS resin is also useful as a base resin or as a compatibilizer for a PAS-containing polymer alloy.

This invention will be explained in more detail in the following Examples, but this invention shall not be limited by these Examples.

EXAMPLES

In each Example and Comparative Example, measurements were carried out as follows.

(1) Melt viscosoty $V_6$

Melt viscosoty $V_6$ was a viscosity (in poise) measured by a flow tester model CFT-500C made by Shimazu Seisakusho Co. after keeping a sample at 300° C., a load of 20 kgf/cm$^2$ and L/D=10 for 6 minutes.

(2) Adhesive strength

Sixty parts by weight of a PAS sample was blended with 40 parts by weight of glass fibre (CS 3J-961S, made by Nitto Boseki Co.) and melt keaded at 320° C. using a counter-rotating twin-screw extruder. From the obtained pellets, flat plates were molded at 320° C. of a cylinder temperature and 130° C. of a mold temperature.

According to JIS K6850, two plates were bonded with each other using an exopxy resin adhesive (made by Nagase Ciba Co., main ingredient: XNR3101, 100 parts, hardening agent: XNH3101, 33.3 parts), under the hardening conditions of 90° C. for 30 minutes to prepare test pieces. Adhesion strength was measured on the obtained test pieces in a tensil test at a tensil speed of 5 mm/minute and a distance between clamps of 130 mm.

In the Examples and the Comparative Examples, the following materials were used.

(A) Starting material PAS:
  PPS-1 (polyphenylene sulfide, H-1, available from Tohpren Co., melt viscosity $V_6$=120 poises)
  PPS-2 (polyphenylene sulfide, T-2, available from Tohpren Co., melt viscosity $V_6$=580 poises)

(B) Organic compound having at least one active hydrogen containing group:
  Bis(4-hydroxyphenyl)sulfon (formula (i) above)
  4,4'-Diaminodiphenyl methane (formula (ii) above)
  3,3'-Dimethyl-4,4'-diamino biphenyl (formula (iii) above)
  4-Aminobenzenesulfonic acid (formula (iv) above)
  1,5-naphthalene dicorboxylic acid (formula (v) above)

(C) Organic compound having an active hydrogen containing groups and a group derived from an active hydrogen containing group by substituting an active hydrogen atom with an alkali metal:
  Sodium sulfanilate (formula (i') above)
  Sodium p-vinylbenzene sulfonate (formula (ii') above)
  Sodium p-vinylbenzoate (formula (iii') above)
  Gamma acid sodium salt (sodium 6-amino-4-hydroxy-2-naphthalene sulfonate) (formula (iv') above)
  Sodium 4-hydroxyphenyl-4-benzene sulfonate (formula (v') above)

Figure 1:
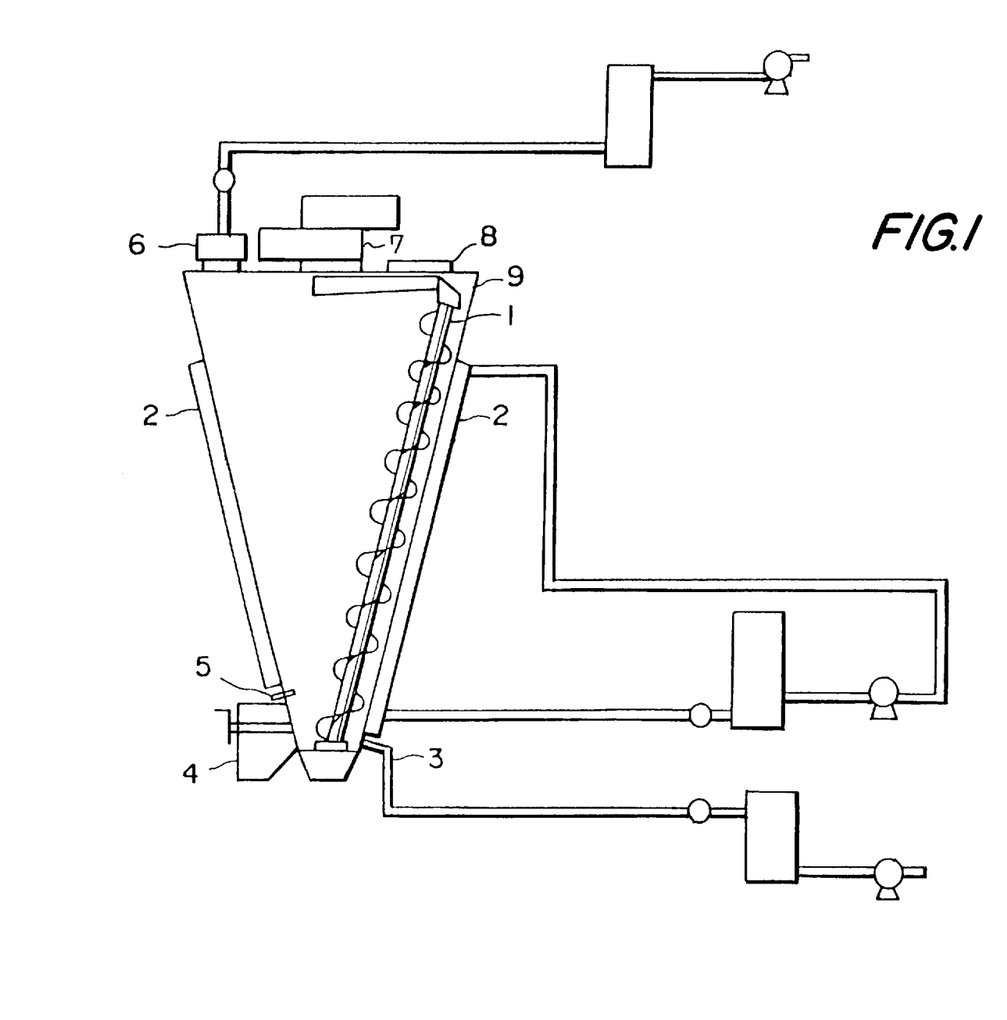
FIG. 1 shows the screw type mixing and heating equipment used in the Examples and Comparative Examples.

In each Example and Comparative Example, the oxidation crosslinking reaction was carried out using air as the oxygen containing atmosphere and a heating equipment with a screw type mixer shown in FIG. 1 which was provided with a gas inlet and a gas outlet and had a capacity of 5 m$^3$.

The numerals in FIG. 1 represent the following parts:
 1: screw which rotates with revolution,
 2: jacket for a heating medium,
 3: gas introducing conduit,
 4: exit for treated PAS,
 5: thermometer,
 6: gas exit (bag filter),
 7: driving motor,
 8: feeding inlet,
 9: inverted conical vessel, Introduction of the functional group to PAS was determined as follows:

Ten grams of the sample was washed by acetone (50 ml) 4 times to remove the organic compound which had not been introduced to PAS, and then dried at 120° C. for 3 hours. FT-IR was measured on this washed polymer.

Example 1

Four hundred kilograms of the starting material PPS-1 and 2 kgs of bis(4-hydroxyphenyl) sulfone were charged in the heating equipment with a screw type mixer, stirred at room temperature for 30 minutes and then stirred at a vessel temperature of 220° C. for 70 hours. A melt viscosity $V_6$ of the obtained PPS containing the functional group was 2,670 poises. Measuring FT-IR on the obtained functional group containing PPS, absorptions based on the stretching vibration of O—H and the symmetric vibration of $S(=O)_2$ were observed at 3,371.1 $cm^{-1}$ and 1,147.8 $cm^{-1}$, respectively, which shows the introduction of OH and $SO_2$ groups as the functional group.

Example 2

Figure 2:
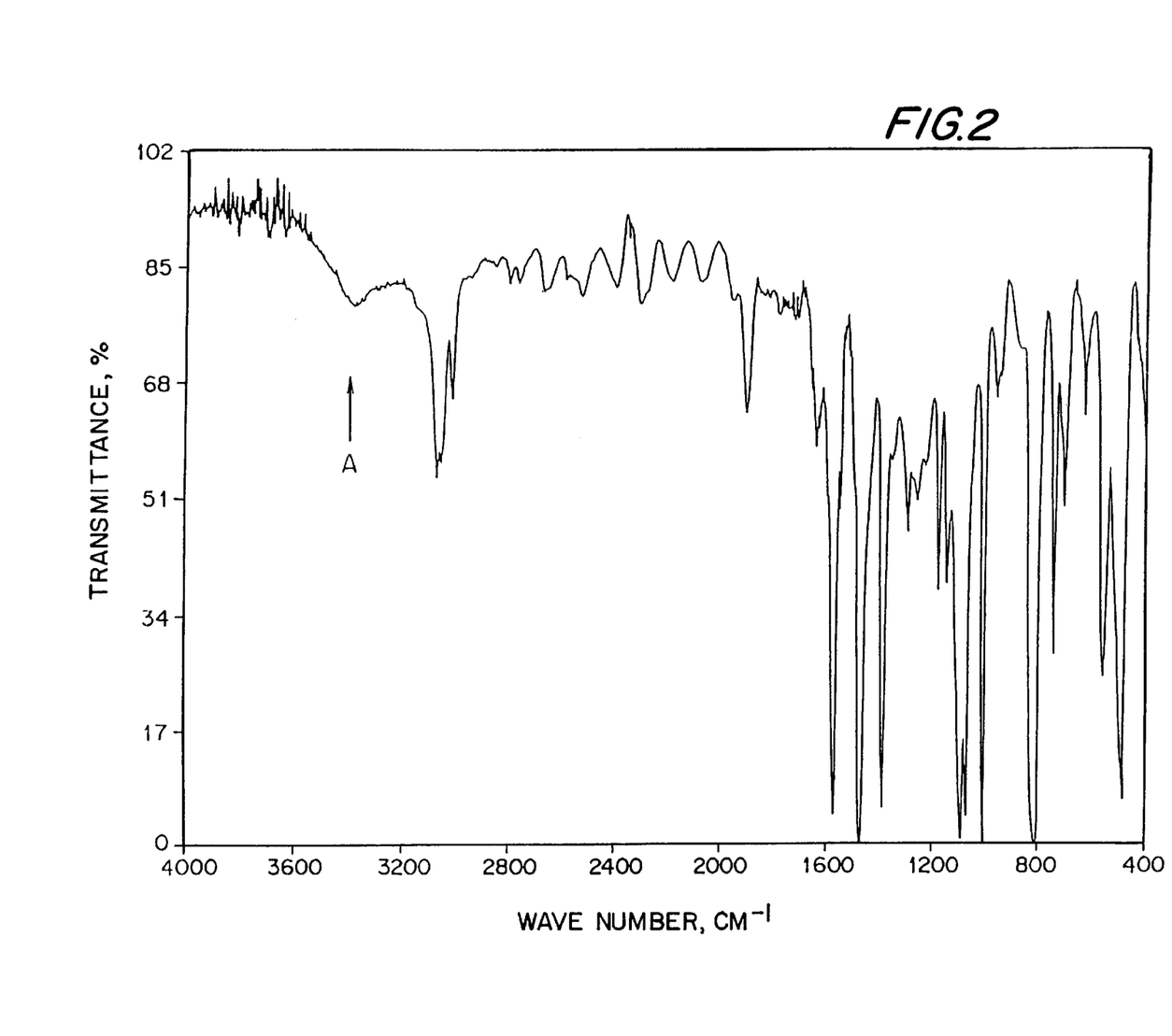
FIG. 2 shows an FT-IR chart of the functional group containing PPS produced in Example 2.
Figure 3:
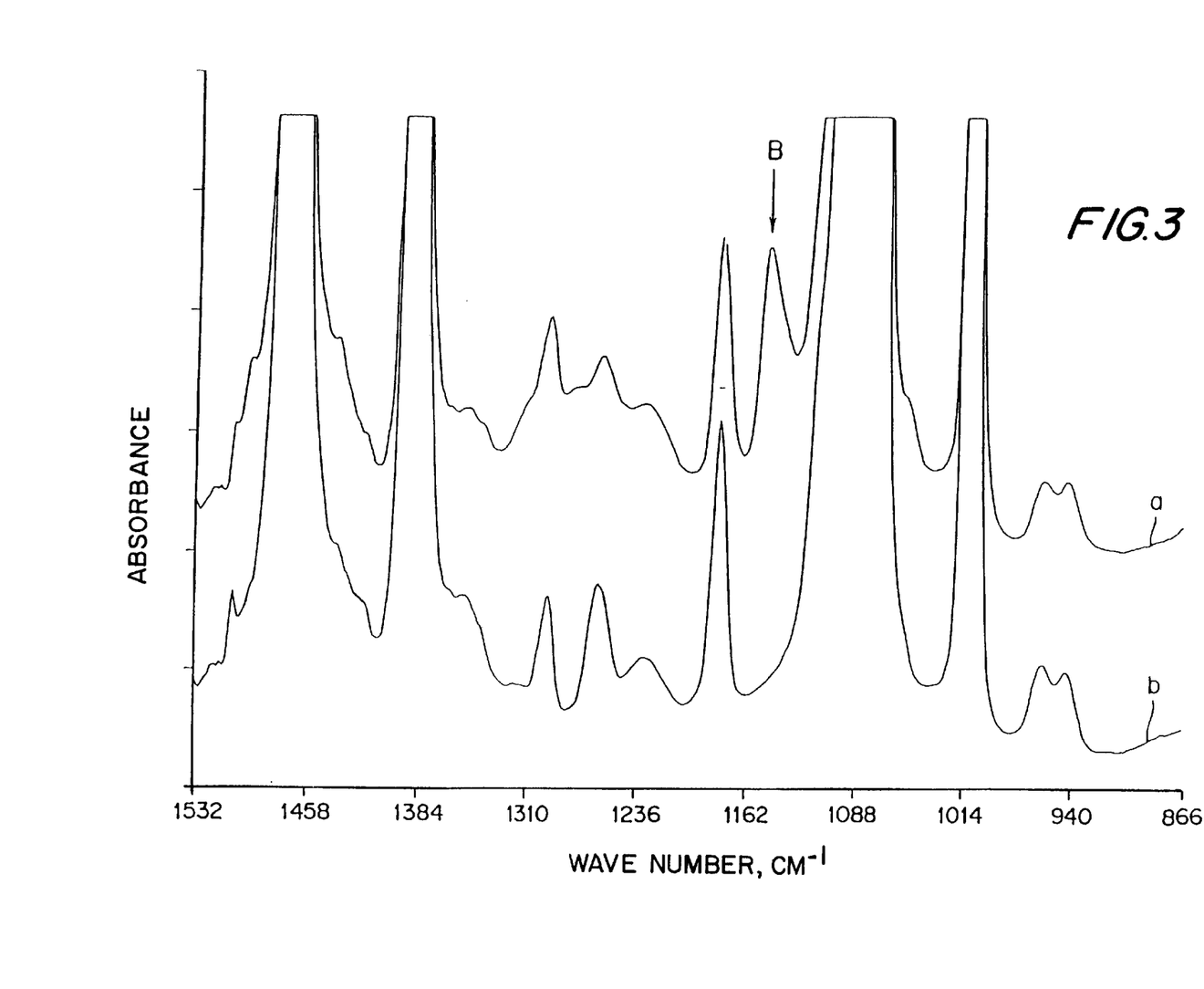
FIG. 3 shows an enlarged FT-IR chart ranging from 1532 to 866 cm$^{-1}$ of the functional group containing PPS produced in Example 2, overlapped with the corresponding part of an FT-IR chart of the starting material PPS.
Figure 4:
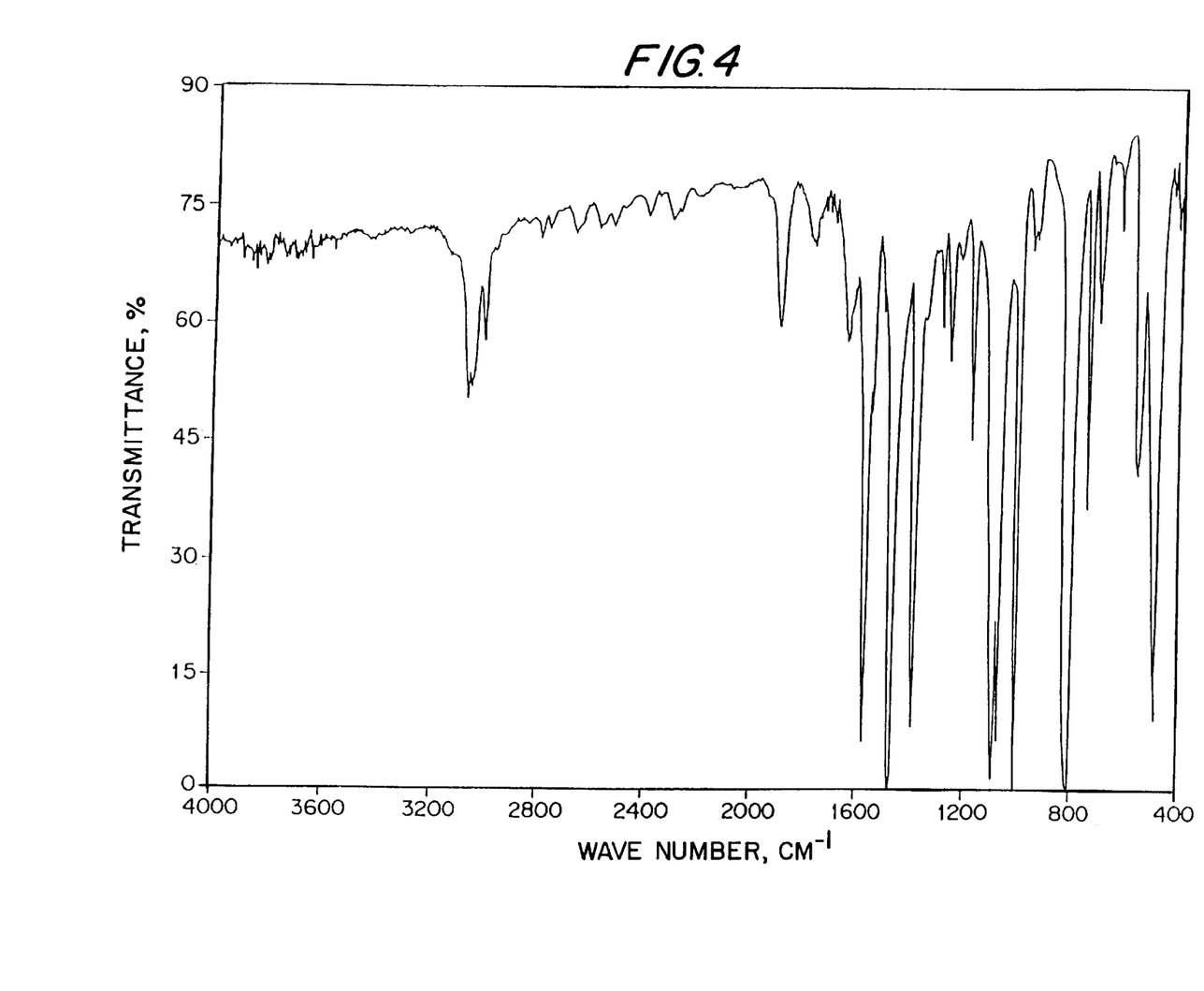
FIG. 4 shows an FT-IR chart of the PPS-1 used as a starting material PAS in Example 2.

Four hundred kilograms of the starting material PPS-1 and 20 kgs of bis(4-hydroxyphenyl) sulfone were charged in the heating equipment with a screw type mixer, stirred at room temperature for 30 minutes and then stirred at a vessel temperature of 220° C. for 33 hours. A melt viscosity $V_6$ of the obtained PPS containing the functional group was 2,800 poises. FT-IR was measured on the obtained functional group containing PPS. The results are as shown in FIGS. 2 and 3. As seen from the Figures, absorptions based on the stretching vibration of O—H (position A in FIG. 2) and the symmetric vibration of $S(=O)_2$ (position B in FIG. 3) were observed at 3,371.1 $cm^{-1}$ and 1,147.8 $cm^{-1}$, respectively. Introduction of OH and $SO_2$ groups as the functional group was confirmed.

Example 3

Four hundred kilograms of the starting material PPS-1 and 2 kgs of 4,4'-diaminodiphenyl methane were charged in the heating equipment with a screw type mixer, stirred at room temperature for 30 minutes and then stirred at a vessel temperature of 220° C. for 38 hours. A melt viscosity $V_6$ of the obtained PPS containing the functional group was 2,680 poises. Measuring FT-IR on the obtained functional group containing PPS, absorptions based on the antisymmetric vibration of N—H and the symmetric vibration of N—H were observed at 3,458.5 $cm^{-1}$ and 3,376.7 $cm^{-1}$, respectively, which shows the introduction of an $NH_2$ group as the functional group.

Example 4

Four hundred kilograms of the starting material PPS-2 and 2 kgs of bis(4-hydroxyphenyl)sulfone were charged in the heating equipment with a screw type mixer, stirred at room temperature for 30 minutes and then stirred at a vessel temperature of 220° C. for 9 hours. A melt viscosity $V_6$ of the obtained PPS containing the functional group was 2,750 poises. Measuring FT-IR on the obtained functional group containing PPS, absorptions based on the stretching vibration of O—H and the symmetric vibration of $S(=O)_2$ were observed at 3,371.1 $cm^{-1}$ and 1147.8 $cm^{-1}$, respectively, which shows the introduction of OH and $SO_2$ groups as the functional group.

Example 5

Four hundred kilograms of the starting material PPS-2 and 2 kgs of 3,3'-dimethyl-4,4'-diaminobiphenyl were charged in the heating equipment with a screw type mixer, stirred at room temperature for 30 minutes and then stirred at a vessel temperature of 220° C. for 7 hours. A melt viscosity $V_6$ of the obtained PPS containing the functional group was 2,880 poises. Measuring FT-IR on the obtained functional group containing PPS, absorptions based on the antisymmetric vibration of N—H and the symmetric vibration of N—H were observed at 3,427.5 $cm^{-1}$ and 3,326.1 $cm^{-1}$, respectively, which shows the introduction of an $NH_2$ group as the functional group.

Example 6

Four hundred kilograms of the starting material PPS-1 and 2 kgs of 4-aminobenzene sulfonic acid were charged in the heating equipment with a screw type mixer, stirred at room temperature for 30 minutes and then stirred at a vessel temperature of 220° C. for 68 hours. A melt viscosity $V_6$ of the obtained PPS containing the functional group was 2,770 poises. Measuring FT-IR on the obtained functional group containing PPS, absorptions based on the antisymmetric vibration of N—H and the symmetric vibration of N—H and, furthermore, the symmetric vibration of $S(=O)_2$ in the $SO_3H$ group were observed at 3,458.5 $cm^{-1}$ and 3,376.7 $cm^{-1}$ and 1,156.5 $cm^{-1}$, respectively, which shows the introduction of an $NH_2$ group and an $SO_3$ group as the functional groups.

Example 7

Four hundred kilograms of the starting material PPS-1 and 2 kgs of 1,5-naphthalene dicarboxylic acid were charged in the heating equipment with a screw type mixer, stirred at room temperature for 30 minutes and then stirred at a vessel temperature of 220° C. for 58 hours. A melt viscosity $V_6$ of the obtained PPS containing the functional group was 2,780 poises. Measuring FT-IR on the obtained functional group containing PPS, absorption based on the stretching vibration of C=O in the COOH group was observed at 1,691.1 $cm^{-1}$, which shows the introduction of a COOH group as the functional group.

Example 8

Four hundred kilograms of the starting material PPS-1 and 2 kgs of 3,3'-dimethyl-4,4'-diaminobiphenyl were charged in the heating equipment with a screw type mixer, stirred at room temperature for 30 minutes and then stirred at a vessel temperature of 220° C. for 61 hours. A melt viscosity $V_6$ of the obtained PPS containing the functional group was 2,810 poises. Measuring FT-IR on the obtained functional group containing PPS, absorptions based on the antisymmetric vibration of N—H and the symmetric vibration of N—H were observed at 3,445.1 $cm^{-1}$ and 3,346.2 $cm^{-1}$, respectively, which shows the introduction of an $NH_2$ group as the functional group.

Comparative Example 1

Four hundred kilograms of the starting material PPS-1 were charged in the heating equipment with a screw type mixer, stirred at room temperature for 30 minutes and then stirred at a vessel temperature of 220° C. for 116 hours. A melt viscosity $V_6$ of the obtained PPS was 2,510 poises.

Comparative Example 2

Four hundred kilograms of the starting material PPS-2 were charged in the heating equipment with a screw type mixer, stirred at room temperature for 30 minutes and then stirred at a vessel temperature of 220° C. for 30 hours. A melt viscosity $V_6$ of the obtained PPS was 2,610 poises.

TABLE 1

|  | Example | | | | | | | | Comparative Example | |
|---|---|---|---|---|---|---|---|---|---|---|
| Sample | 1 | 2 | 3 | 4 | 5 | 6 | 7 | 8 | 1 | 2 |
| Melt viscosity $V_6$, poise | 2670 | 2800 | 2680 | 2750 | 2880 | 2770 | 2780 | 2810 | 2510 | 2610 |
| Adhesion strength, kgf/cm$^2$ | 92 | 128 | 105 | 97 | 109 | 75 | 85 | 91 | 48 | 45 |

Hereinafter, the second aspect of the invention will be described.

Example 9

Four hundred kilograms of PPS-1 and 2 kgs of sodium sulfanilate were charged in the heating equipment with a screw type mixer, stirred at room temperature for 30 minutes and then stirred at a vessel temperature of 220° C. for 16 hours. A melt viscosity $V_6$ of the obtained PPS containing the functional group was 510 poises. Measuring FT-IR on the obtained functional group containing PPS, absorptions based on the antisymmetric vibration of N—H and the symmetric vibration of N—H were observed at 3,458.5 cm$^{-1}$ and 3,376.7 cm$^{-1}$, respectively. In addition to that, absorption based on the symmetric vibration of $S(=O)_2$ in the $SO_3Na$ group was observed at 1,048.3 cm$^{-1}$, which shows the introduction of an $SO_3Na$ group as the functional group.

Example 10

Four hundred kilograms of PPS-1 and 2 kgs of sodium sulfanilate were charged in the heating equipment with a screw type mixer, stirred at room temperature for 30 minutes and then stirred at a vessel temperature of 220° C. for 300 hours. A melt viscosity $V_6$ of the obtained PPS containing the functional group was 8,500 poises. Measuring FT-IR on this PPS, absorptions based on the antisymmetric vibration of N—H and the symmetric vibration of N—H of the amino group disappeared, but absorption based on the symmetric vibration of $S(=O)_2$ in the $SO_3Na$ group was observed at 1,048.3 cm$^{-1}$, which shows the introduction of an $SO_3Na$ group as the functional group. This proves the presence of $SO_3Na$ group in PPS molecules even after such long time heating.

Example 11

Four hundred kilograms of PPS-1 and 6 kgs of sodium sulfanilate were charged in the heating equipment with a screw type mixer, stirred at room temperature for 30 minutes and then stirred at a vessel temperature of 220° C. for 10 hours. A melt viscosity $V_6$ of the obtained PPS containing the functional group was 500 poises. Measuring FT-IR on this PPS, absorptions based on the antisymmetric vibration of N—H and the symmetric vibration of N—H were observed at 3,458.5 cm$^{-1}$ and 3,376.7 cm$^{-1}$, respectively. In addition to that, absorption based on the symmetric vibration of $S(=O)_2$ in the $SO_3Na$ group was observed at 1,048.3 cm$^{-1}$, which shows the introduction of $SO_3Na$ group as the functional group.

Example 12

Four hundred kilograms of PPS-1 and 2 kgs of sodium p-vinylbenzene sulfonate were charged in the heating equipment with a screw type mixer, stirred at room temperature for 30 minutes and then stirred at a vessel temperature of 220° C. for 18 hours. A melt viscosity $V_6$ of the obtained PPS containing the functional group was 650 poises. Measuring FT-IR on this PPS, absorption based on the symmetric vibration of $S(=O)_2$ in the $SO_3Na$ group was observed at 1,050.4 cm$^{-1}$, which shows the introduction of an $SO_3Na$ group as the functional group.

Example 13

Four hundred kilograms of PPS-1 and 2 kgs of sodium p-vinylbenzoate were charged in the heating equipment with a screw type mixer, stirred at room temperature for 30 minutes and then stirred at a vessel temperature of 220° C. for 15 hours. A melt viscosity $V_6$ of the obtained PPS containing the functional group was 480 poises. Measuring FT-IR on this PPS, absorption based on the stretching vibration of C=O in the COONa group was observed at 1,690.8 cm$^{-1}$, which shows the introduction of a COONa group as the functional group.

Example 14

Four hundred kilograms of PPS-1 and 2 kgs of a sodium salt of gamma acid were charged in the heating equipment with a screw type mixer, stirred at room temperature for 30 minutes and then stirred at a vessel temperature of 220° C. for 10 hours. A melt viscosity $V_6$ of the obtained PPS containing the functional group was 690 poises. Measuring FT-IR on this PPS, absorption based on the symmetric vibration of $S(=O)_2$ in the $SO_3Na$ group was observed at 1,048.3 cm$^{-1}$, which shows the introduction of an $SO_3Na$ group as the functional group.

Example 15

Four hundred kilograms of PPS-1 and 2 kgs of sodium 4-hydroxyphenyl-4-benzene sulfonate were charged in the heating equipment with a screw type mixer, stirred at room temperature for 30 minutes and then stirred at a vessel temperature of 220° C. for 18 hours. A melt viscosity $V_6$ of the obtained PPS containing the functional group was 590 poises. Measuring FT-IR on this PPS, absorption based on the symmetric vibration of $S(=O)_2$ in the $SO_3Na$ group was observed at 1,047.1 cm$^{-1}$, which shows the introduction of an $SO_3Na$ group as the functional group.

Example 16

Three hundred kilograms of the PPS having $SO_3Na$ group obtained in Example 9 was put in one liter of an aqueous hydrochloric acid solution of which pH had been adjusted to 2, and stirred for 2 hours at room temperature. After the acid treatment, the PPS was put in one liter of ion exchanged water, stirred for 5 minutes, filtered and washed. Then the obtained cake was dried at 120° C. for 4.5 hours. Measuring FT-IR on the obtained PPS, absorption based on the symmetric vibration of $S(=O)_2$ in the $SO_3H$ group was observed at 1,145.1 cm$^{-1}$, which confirms the conversion of the $SO_3Na$ group of PPS to an $SO_3H$ group.

Comparative Example 3

Four hundred kilograms of PPS-1 and 2 kgs of sodium benzoate were charged in the heating equipment with a screw type mixer, stirred at room temperature for 30 minutes and then stirred at a vessel temperature of 220° C. for 20 hours. A melt viscosity $V_6$ of the obtained PPS containing the functional group was 350 poises. Measuring FT-IR on this PPS, absorption based on the stretching of C=O of the COONa group was not observed, which shows that no introduction of a COONa group occurred.

Example 17

Four hundred kilograms of PPS-1 and 2 kgs of sulfanilic acid were charged in the heating equipment with a screw type mixer, stirred at room temperature for 30 minutes and then stirred at a vessel temperature of 220° C. for 68 hours. A melt viscosity $V_6$ of the obtained PPS containing the functional group was 2,770 poise. Measuring FT-IR on this PPS, absorptions based on the antisymmetric vibration of N—H and the symmetric vibration of N—H were observed at 3,458.5 cm$^{-1}$ and 3,376.7 cm$^{-1}$, respectively. In addition to that, absorption based on the symmetric vibration of $S(=O)_2$ in the $SO_3H$ group was observed at 1,156.5 cm$^{-1}$. These show the introduction of $NH_2$ and $SO_3$ groups as the functional group.

Example 18

Four hundred kilograms of PPS-1 and 2 kgs of sulfanilic acid were charged in the heating equipment with a screw type mixer, stirred at room temperature for 30 minutes and then stirred at a vessel temperature of 220° C. for 300 hours. A melt viscosity $V_6$ of the obtained PPS containing the functional group was 12,510 poises. Measuring FT-IR on this PPS, no absorption based on the antisymmetric vibration of N—H or the symmetric vibration of N—H derived from an amino group were observed. Absorption supposedly based on the symmetric vibration of $S(=O)_2$ of —Ph—$SO_2$—Ph— group probably formed from the $SO_3H$ group of the sulfanilic acid was observed at 1,147.1 cm$^{-1}$.

The results obtained above are shown in Tables 2 and 3 below.

TABLE 3

|  | Comparative Example | Example | |
|---|---|---|---|
|  | 3 | 17 | 18 |
| Quantity of the components, kg Component (a) | | | |
| PPS-1 | 400 | 400 | 400 |
| Component (b) | | | |
| Sodium benzoate (comparative) | 2 | — | — |
| Sulfanic acid | — | 2 | 2 |
| Heat oxidation crosslinking conditions | | | |
| Temperature, ° C. | 220 | 220 | 220 |
| Time, hr | 20 | 68 | 300 |
| Properties of the heat treated PPS | | | |
| Melt viscosity $V_6$, poise | 350 | 2770 | 12510 |
| Adhesion strength, kgf/cm$^2$ | 47 | 75 | 51 |

In Examples 9 through 11, sodium sulfanilate was used as the organic compound. Good adhesive strength was obtained in all of the cases. In Example 10, the conditions were same as in Example 9 except that heat the oxidation crosslinking time was extended significantly to 300 hours. Then, PPS having a high adhesive strength and a high degree of crosslinking was obtained. In Example 11, the quantity of sodium sulfanilate was increased and the heat oxidation crosslinking time was shortened compared to those of Example 9. Much higher adhesive strength was obtained. In Examples 12 and 13, sodium p-vinylbenzene sulfonate and sodium p-vinylbenzoate were used as the organic compound, respectively. Good adhesive strength was obtained in both cases. In Examples 14 and 15, gamma acid sodium salt and sodium 4-hydroxyphenyl-4-benzene sulfonate were used as the organic compound, respectively. Good adhesion was attained in both cases. In Example 16, the $SO_3Na$ group in the PPS obtained in Example 9 was changed to a $SO_3H$ group by acid washing. The adhesive strength could be significantly increased.

On the other hand, in Comparative Example 1, the organic compound was not used. Adhesive strength was significantly

TABLE 2

|  | Example | | | | | | | |
|---|---|---|---|---|---|---|---|---|
|  | 9 | 10 | 11 | 12 | 13 | 14 | 15 | 16 |
| Quantity of the components, kg Component (a) | | | | | | | | |
| PPS-1 | 400 | 400 | 400 | 400 | 400 | 400 | 400 | 400 |
| Component (b) | | | | | | | | |
| Sodium sulfanilate | 2 | 2 | 6 | — | — | — | — | 2 |
| Sodium p-vinylbenzene sulfonate | — | — | — | 2 | — | — | — | — |
| Sodium p-vinylbenzoate | — | — | — | — | 2 | — | — | — |
| Gamma acid sodium salt | — | — | — | — | — | 2 | — | — |
| Sodium 4-hydroxyphenyl-4-benzene sulfonate | — | — | — | — | — | — | 2 | — |
| Heat oxidation crosslinking conditions | | | | | | | | |
| Temperature, ° C. | 220 | 220 | 220 | 220 | 220 | 220 | 220 | 220 |
| Time, hr | 16 | 300 | 10 | 18 | 15 | 10 | 18 | 16 |
| Properties of the heat treated PPS | | | | | | | | |
| Melt viscosity $V_6$, poise | 510 | 8500 | 500 | 650 | 480 | 690 | 590 | 540 |
| Adhesion strength, kgf/cm$^2$ | 89 | 87 | 131 | 95 | 87 | 98 | 88 | 121 | low. In Comparative Example 3, use was made of the organic compound which had only the groups in which a hydrogen atom of the active hydrogen containing group was substituted with an alkali metal, but had no active hydrogen containing group. As in the case above, adhesive strength was significantly low.

In Examples 17 and 18, sulfanic acid was used which is the organic compound having active hydrogen containing groups only according to the first aspect of the invention. In each cases, adhesive strength were lower than that of Examples 9 and 10, where sodium sulfanilate was used. From Example 18, it is seen that when the organic compound having only active hydrogen containin groups only was used, adhesive strength is lower if highly crosslinked PPS shall be obtained.

As described above, PPS having high adhesive strength can be produced with the use of the organic compound of the second aspect of the invention independently of heat oxidation crosslinking conditions. Accordingly, PPS having also a desired degree of crosslinking can be easily obtained by changing a treatment time. On the other side, even in the case where the organic compound having only active hydrogen containing groups is used, PPS having a relatively high adhesive strength can be produced, but the adhesive strength depends largely on the temperature and time of the heat oxidation crosslinking. Therefore the temperature and time have to be precisely controlled to obtain PPS having desired properties, which results in less easiness and less simplicity in comparison with the second aspect of this invention.

We claim:

1. A process for heat oxidation crosslinking a polyarylene sulfide resin, characterized by conducting the heat oxidation crosslinking reaction in the presence of at least one organic compound having at least one active-hydrogen-containing group to thereby prepare a functional group-containing polyarylene sulfide resin.

2. A process described in claim 1, wherein the active hydrogen containing group is selected from the group consisting of —SH, —OH, —NH$_2$, —COOH, —CHO and —SO$_3$H.

3. A process described claim 1, wherein the organic compound having at least one active hydrogen containing group is selected from the group consisting of compounds (I) to (V):

(I)

wherein X and Y are a group independently selected from the group consisting of —SH, —OH, —NH$_2$, —COOH, —CHO and —SO$_3$H; R is a group independently selected from a hydrogen atom, a halogen atom, lower alkyl groups and lower alkoxyl groups; p=0 to 4, q=1 to 5, r=1 to 5 and p+q+r=6, (II)

wherein X, Y and R have the same meaning as defined above; Z is —O—, —SO—, —SO$_2$—, —S—, —CO—, or —(CR$^a_2$)$_m$—, wherein R$^a$ is a hydrogen atom, a lower alkyl group or a lower alkoxy group, and m=1 to 4; and s=1 to 5, h=0 to 4 and s+h=5, t=1 to 5, j=0 to 4 and t+j=5, i=0 to 4 and n=0 to 11, (III)

wherein X, Y and R have the same meaning as defined above; u=1 to 5, k=0 to 4 and u+k=5, v=1 to 4, g=0 to 3 and v+g=4, (IV)

(V)

wherein X, Y and R have the same meaning as defined above; and y=1 to 4, a=0 to 3 and y+a=4, z=1 to 4, b=0 to 3 and z+b=4, c=0 to 4, y'=1 to 3, z'=1 to 3 and y'+z'=4, (VI)

wherein X,Y and R have the same meaning as defined above; and e=1 to 5, c=0 to 4, and e+c=5, f=1 to 5, d=0 to 4 and f+d=5.

4. A process described in claim 1, wherein 0.05 to 10 parts by weight of the organic compound having at least one active-hydrogen-containing group is used per 100 parts by weight of a polyarylene sulfide polymer.

5. A process described in claim 1, wherein the organic compound is represented by one of the following formulas:

(i)

(ii)

(iii)

(iv)

(v)

from the group consisting of —COOA, —OA, —SA and —SO₃A, wherein A represents an alkali metal; R is a group independently selected from a hydrogen atom, a halogen atom, lower alkyl groups and lower alkoxyl groups; p=0 to 4, q=1 to 5, r=1 to 5 and p+q+r=6, (II′)

wherein X, Y and R have the same meaning as defined above; Z is —O—, —SO—, —SO₂—, —S—, —CO—, or —(CR$^a$₂)$_m$—, wherein R$^a$ is a hydrogen atom, a lower alkyl group or a lower alkoxy group, and m=1 to 4; and s=1 to 5, h=0 to 4 and s+h=5, t=1 to 5, j=0 to 4 and t+j=5, i=0 to 4 and n=0 to 11, (III′)

wherein X, Y and R have the same meaning as defined above; u=1 to 5, k=0 to 4 and u+k=5, v=1 to 4, g=0 to 3 and v+g=4, (IV′)

wherein X, Y and R have the same meaning as defined above; w=1 to 5, m=0 to 4 and w+m=5, x=1 to 4, n=0 to 3 and x+n=4, wherein X, Y and R have the same meaning as defined above; and y=1 to 4, a=0 to 3 and y+a=4, z=1 to 4, b=0 to 3 and z+b 4, c=0 to 4, y′=1 to 3, z′=1 to 3 and y′+z′=4, 6. A process described in claim 1, wherein the organic compound has at least two of the active hydrogen-containing groups.

7. A process for heat oxidation crosslinking a polyarylene sulfide polymer in an oxygen containing atmosphere, characterized by conducting the heat oxidation crosslinking reaction in the presence of an organic compound having at least one active-hydrogen-containing group and a group derived from an active hydrogen containing group by substituting an active hydrogen atom of the active hydrogen containing group with an alkali metal, to thereby prepare a functional group-containing polyarylene sulfide resin.

8. A process described in claim 7, wherein the group derived by substituting an active hydrogen atom of an active hydrogen containing group with an alkali metal is selected from the group consisting of —COOA, —OA, —SA and —SO₃A, wherein A represents an alkali metal.

9. A process described in claim 7, wherein the active hydrogen containing group is selected from the group consisting of —CH=CH₂, —SH, —OH, —NH₂, —COOH, —CHO and —SO₃H.

10. A process described in claim 7, wherein the organic compound is an aromatic compound.

11. A process described in claim 7, wherein the organic compound is selected from the following group of compounds:

(I′)

wherein X is a group independently selected from the group consisting of —CH=CH₂, —SH, —OH, —NH₂, —COOH, —CHO and —SO₃H; Y is a group independently selected (VI')

wherein X,Y and R have the same meaning as defined above; and e=1 to 5, c=0 to 4, and e+c=5, f=1 to 5, d=0 to 4 and f+d=5.

12. A process described in claim 7, wherein the organic compound is represented by the following formulas.

(VII)

wherein Y has the same meaning as defined above.

13. A process described in claim 7, wherein the organic compound is represented by one of the following formulas (i') to (iii')

(i')

(ii')

-continued (iii')

(iv')

(v')

14. A process described in claim 7, wherein 0.05 to 10 parts by weight of the organic compound is used per 100 parts by weight of a polyarylene sulfide polymer.

15. A process described in claim 7, wherein 0.1 to 3 parts by weight of the organic compound is used per 100 parts by weight of polyarylene sulfide polymer.

16. A process described in claim 1 or 7, wherein the active hydrogen containing group is selected from the group consisting of —SH, —OH, —NH$_2$, —NHR', —COOH, —CONH$_2$, —CONHR', —SO$_3$H, —CHO, —CH=CH$_2$, —CH=CHR', —C≡CH, wherein R' is an organic group.

* * * * *